B. S. KURTZ.
TRACE HOOK.
APPLICATION FILED APR. 5, 1912.
1,053,833.
Patented Feb. 18, 1913.
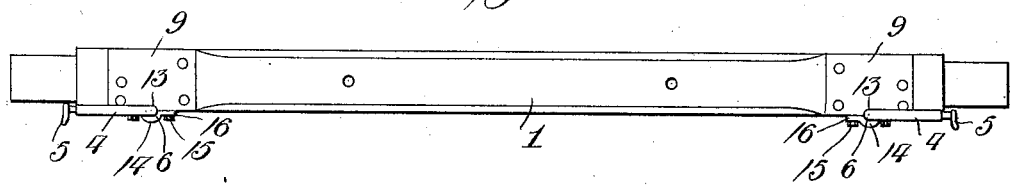
Fig. 1.
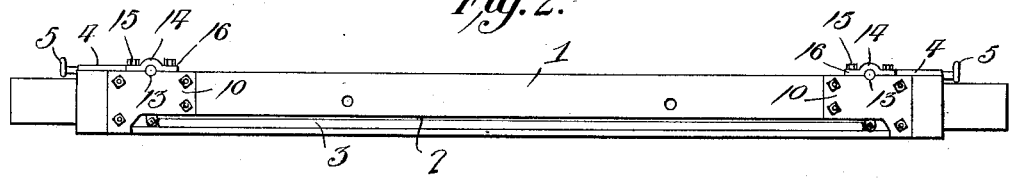
Fig. 2.
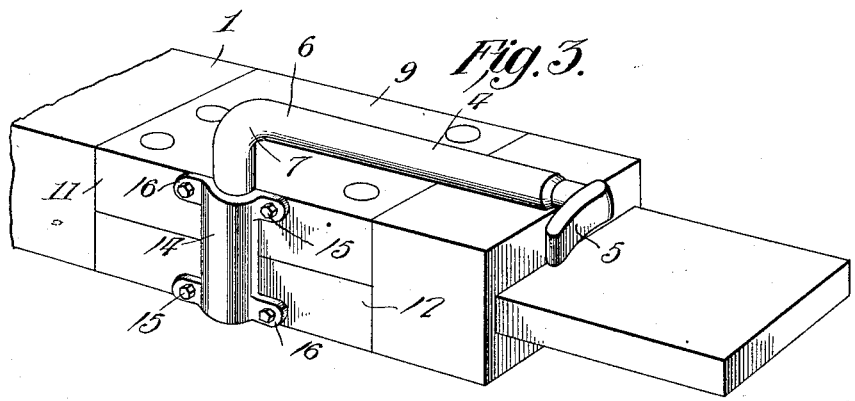
Fig. 3.
Fig. 5.
Fig. 4.
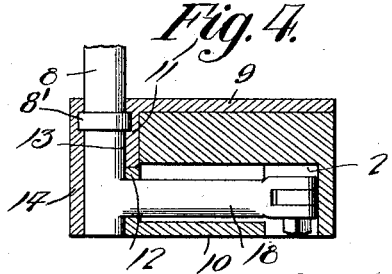
Witnesses
Carroll Bailey.
P. M. Smith
Inventor
Barton S. Kurtz,
By Victor J. Evans
Attorney

UNITED STATES PATENT OFFICE.

BARTON S. KURTZ, OF GAP, PENNSYLVANIA.

TRACE-HOOK.

1,053,833.  Specification of Letters Patent.  Patented Feb. 18, 1913.

Application filed April 5, 1912. Serial No. 688,701.

*To all whom it may concern:*

Be it known that I, BARTON S. KURTZ, a citizen of the United States, residing at Gap, in the county of Lancaster and State of Pennsylvania, have invented new and useful Improvements in Trace-Hooks, of which the following is a specification.

This invention relates to trace hooks, the object in view being to provide in connection with the cross bar of a pair of thills or shafts, a pair of trace hooks mounted for pivotal movement in horizontal planes and connected so that the movement of one of the trace hooks in one direction will effect a corresponding movement of the other trace hook in the opposite direction. By means of the construction hereinafter described, the stress or pull of the traces on the hooks and cross bar of the thills is equalized or distributed, thereby greatly facilitating the work of the draft animal.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a top plan view, showing the cross bar of a pair of thills or shafts, with the trace hooks of this invention applied thereto. Fig. 2 is a bottom plan of the same. Fig. 3 is an enlarged perspective view, showing one end of the cross bar with one of the trace hooks and its mounting applied thereto. Fig. 4 is a vertical cross section through the same, in line with the crank arm of the trace hook. Fig. 5 is a detail perspective view of the joint between the crank arm and connecting rod.

Referring to the drawings, 1 designates the cross bar of a pair of thills or shafts, to which the present invention is shown applied. This cross bar is provided in its under side with a groove 2 extending lengthwise thereof, and adapted to receive and house the connecting rod 3 of this invention. Adjacent to the opposite ends of the cross bar are mounted the trace hooks 4, each of which is provided with a terminal keeper or hook 5 of any suitable or preferred construction. Each trace hook 4 is offset horizontally, as shown at 6, and then bent at 7 to extend downwardly, the downwardly extending portion indicated at 8 forming a journal or pintle, which is mounted in a bearing, adapting the main body 4 of the trace hook to swing in a horizontal path, the journal 8 forming the vertical axis upon which the trace hook turns.

In order to connect the trace hook in a substantial manner to the cross bar 1, I provide a bearing of sectional construction, said bearing embodying top and bottom plates 9 and 10, respectively, which are preferably countersunk into the top and bottom surfaces of the cross bar 1, as clearly shown in the drawings, said top and bottom plates embodying the vertical flanges 11 and 12 which extend toward each other on one of the side faces of the cross bar. These flanges 11 and 12 are formed with semi-cylindrical bearings 13 for the journal 8 of the trace hook, the other half of the bearing being formed by a separable one-piece semi-cylindrical bearing section and yoke 14 which is secured to the flanges 11 and 12 by means of screws 15 or their equivalent passing through lugs or ears 16 on the bearing section 14, and engaging the flanges 11 and 12, as clearly illustrated. Each journal 8 is provided with an annular enlargement 8', working in a corresponding recess or extension of the bearing and forming a stop shoulder to hold the journal against vertical movement. Near its lower end, the journal 8 has rigidly connected therewith a laterally extending crank arm 18 which is pivotally connected, to one extremity of the connecting rod 3, hereinabove referred to. The pivotal connection just referred to is in the form of a knuckle or rule joint, one of the parts, and preferably the connecting rod 3, being thickened or provided with oppositely extending shoulders 19 which serve to protect the bolt or rivet forming the pivot.

From the foregoing description, it will now be understood that when the traces are connected to the hooks 5, should a greater strain be brought to bear on one hook rather than the other, the hooks will turn in opposite directions, thereby equalizing the pull on the animal and vehicle, bringing the stress equally upon both ends of the cross bar of the thills, the movement of one trace hook being transmitted through the medium of the connecting rod to the other trace hook.

What is claimed is:

The combination with the cross bar of a pair of thills, of metal bearing plates of L-shape in cross section secured to said cross bar near the ends thereof, a combined yoke and bearing section connecting said plates, trace hooks having vertical journals mounted in said bearings, crank arms on said journals, and a rod connecting the crank arms.

In testimony whereof I affix my signature in presence of two witnesses.

BARTON S. KURTZ.

Witnesses:
 ETHEL SOMMERS,
 S. C. LIGETT.

---

Copies of this patent may be obtained for five cents each, by addressing the "Commissioner of Patents, Washington, D. C."